United States Patent [19]

Schnitzius

[11] 4,257,580

[45] Mar. 24, 1981

[54] PNEUMATIC SPRING

[75] Inventor: Klaus Schnitzius, Rheinbrohl, Fed. Rep. of Germany

[73] Assignee: Stabilus GmbH, Koblenz-Neuendorf, Fed. Rep. of Germany

[21] Appl. No.: 68,548

[22] Filed: Aug. 22, 1979

[30] Foreign Application Priority Data

Aug. 29, 1978 [DE] Fed. Rep. of Germany ... 7825656[U]

[51] Int. Cl.³ ............................................. F16F 9/43
[52] U.S. Cl. .................................. 267/65 R; 188/322
[58] Field of Search .............. 137/223; 188/285, 286, 188/322; 251/339; 267/64 R, 65 R, 65 D

[56] References Cited

U.S. PATENT DOCUMENTS

| Re. 28,329 | 2/1975 | Nicholls . | |
|---|---|---|---|
| 1,943,851 | 1/1934 | Warren | 188/322 X |
| 2,737,384 | 3/1957 | Lauguadin . | |
| 3,447,645 | 6/1969 | Dörner et al. | 188/269 |
| 3,739,885 | 6/1973 | Bainbridge . | |
| 3,913,901 | 10/1975 | Mölders . | |
| 3,963,227 | 6/1976 | Mölders . | |
| 4,030,716 | 6/1977 | Freitag | 267/64 R |
| 4,037,860 | 7/1977 | Thiele | 267/65 D X |
| 4,044,866 | 8/1977 | Ishida . | |

FOREIGN PATENT DOCUMENTS

| 645554 | 11/1950 | United Kingdom . |
|---|---|---|
| 668563 | 3/1952 | United Kingdom . |
| 682110 | 11/1952 | United Kingdom . |
| 889149 | 2/1962 | United Kingdom . |
| 1035304 | 7/1966 | United Kingdom . |
| 1056727 | 1/1967 | United Kingdom . |
| 1339976 | 12/1973 | United Kingdom . |

Primary Examiner—Duane A. Reger
Attorney, Agent, or Firm—Brumbaugh, Graves, Donohue & Raymond

[57] ABSTRACT

In the illustrative embodiments disclosed, an improved pressure-adjustment valve assembly for a pneumatic spring includes a valve channel connected at one end to the interior and at the other end to the exterior of the spring cylinder. The valve channel is preferably defined in part by a bore in an integral part of the cylinder and in part by a cap member removably mounted on such integral part. A valve body is axially movable within the valve channel between open and closed positions, coacting when in the closed position with a surrounding sealing ring to seal the cylinder against fluid leakage. The valve body is shaped to insure long seal lifetime. All components of the valve structure are designed and constructed to facilitate manufacture, use and assembly of the valve and to permit use of readily available materials.

20 Claims, 4 Drawing Figures

PNEUMATIC SPRING

BACKGROUND

1. Field of the Invention

The present invention relates in general to high-pressure pneumatic springs and, more particularly, to a new and improved valve structure for use in controlling the fluid pressure within such springs.

2. The Prior Art

It is known in the prior art to provide a valve in the end or side wall of a pneumatic spring for the purpose of enabling recharging or venting of the fluid pressure with the spring. Such known valves have typically been modified versions or designs of the low-pressure type commonly used with automobile tires or the like, These valves, however, have not been entirely satisfactory at the high pressures, e.g. up to 100 bar, used in pneumatic springs. It has been found, for example, that such tire-type valves are susceptible to leakage in high-pressure pneumatic spring use, and particularly after multiple pressure-relieving operations. This leakage is thought to result from damage to the rubber sealing element commonly used in valves of this type.

SUMMARY

It is therefore an object of the invention to provide a pneumatic spring having an improved valve construction that overcomes the aforementioned and other disadvantages of the prior art.

It is a further object of the invention to provide a simplified valve design which is readily and economically manufactured and assembled.

Still a further object of the invention is to provide a valve design which remains fluid tight after a plurality of operations cycles, even if very high pressures of up to 100 bar are present within the pneumatic spring.

The foregoing and other objects of the invention are attained by the provision in a pneumatic spring of a valve assembly including a generally cylindrical valve channel which is connected at one end to the interior of the pneumatic spring and at the other end to the exterior of the spring. An annular groove opens through the side wall of the valve channel and contains an annular sealing member. Received for movement between two axial positions within the valve channel is a valve body having at least two axial portions, a first generally cylindrical portion of an external diameter to establish sealing engagement with the internal surface of the sealing member when the valve body is at one axial position within the valve channel and a second, smaller cross sectional portion that is moved into axial alignment with the sealing member and defines a clearance for fluid flow therebetween when the valve body is at a second axial position within the valve channel. Fluid flow through the valve is thus prevented when the valve body is in the first position and permitted when the valve body is in the second position. Preferably, the valve body is normally biased to the first, or closed, position. Provision is also made for the application of an external fitting or the like to the valve assembly to enable connection of the spring interior to a pressure source or to atmosphere.

Certain additional features of the valve structure of the invention contribute to economies of manufacture and/or ease of assembly and use. For instance, the second portion of the valve body is also preferably circular in cross section to facilitate machineability, and the portion of the valve body joining the first and second portions is advantageously conical in shape so as to taper from the larger diameter of the first valve body portion to the smaller diameter of the second valve body portion. This configuration of the valve body assures a fluid tight seal at low cost, and at the same time avoids damage to the sealing element even under conditions of high pressure and repeated use. As a further feature for facilitating operation of the valve and for guiding movement of the valve body within the valve channel, the valve body may include a third portion at that end of the second portion remote from the first body portion. The third portion is also preferably cylindrical in shape and of a diameter somewhat smaller than the diameter of the valve channel. This permits fluid flow outward from the valve channel via the clearance around the third body portion.

For positively defining when the valve body is in the first, of closed, position within the valve channel, the channel may be provided with a section of reduced diameter adjacent its second part, a shoulder thereby being formed by the reduction in diameter. Axial engagement of the third valve body portion with the shoulder then establishes the first valve body position. As noted, biasing means are suitably provided to urge the valve body to the first position. The biasing means, which may be represented by the interior pressure within the cylinder or, still more advantageously, by a helical compression spring, preferably acts against that face of the first valve body portion remote from the second valve body portion.

For purposes both of ease of manufacturability and of reliable operation, the annular sealing groove is preferably defined by a first substantially radial face adjacent the first valve channel part, a second substantially radial face adjacent the second valve channel part, and a cylindrical outer face extending in a substantially axial direction between the first and second radial faces. Also in view of more reliable operation of the sealing member, it is preferable that a zone of the annular groove which is adjacent both the cylindrical outer face and the second radial face be in fluid connection with the second valve channel part so as to balance the fluid pressure within the annular groove. As still another feature of the invention, the annular sealing member suitably has a substantially circular cross section when out of contact with the valve body and when regarded in a plane containing the axis of the valve channel. This permits use of readily available sealing members.

Another feature of the invention which contributes to the reliability and fluid tightness of the valve assembly is that the annular sealing member is sized and selected such that it is biased by its inherent structural elasticity to a position away from the valve body when the valve body is in the second, or open, position. This elastic behavior of the sealing member is important in maintaining the member in the proper position both in opening and closing of the valve.

For still further economies of manufacture and assembly, the valve channel is preferably defined in part by a bore in an integral part of the spring cylinder and in part by a bore in a cap member that is removably mounted on the integral part. The cap member may be suitably provided with a cylindrical mounting portion that mates with a mounting bore in the integral part. Advantageously, the annular sealing groove is in part formed in the integral part so as to open axially into the mounting bore, with an axially directed end face of the mounting portion of the cap member then closing the annular groove in the axial direction.

To avoid damaging the annular sealing member when mounting the cap member, an annular disc may be provided in the annular groove adjacent to the axially directed end face of the cap member. This annular disc may also be used to provide the aforementioned pressure-balancing fluid connection between the annular groove and the valve channel, for example, a first part of the fluid connection may be defined at the outer peripheral face of the annular disc and a second part thereof may either be defined by a radially extending groove in the axially directed end face of the mounting portion or by a radially extending groove in that face of the annular disc adjacent to the axially directed end face of the mounting portion.

BRIEF DESCRIPTION OF THE DRAWINGS

Further constructive and functional features and advantages of the invention will be apparent from the following description of a representative embodiment thereof, taken in conjunction with the figures of the accompanying drawings, in which.

DETAILED DESCRIPTION

Figure 1:
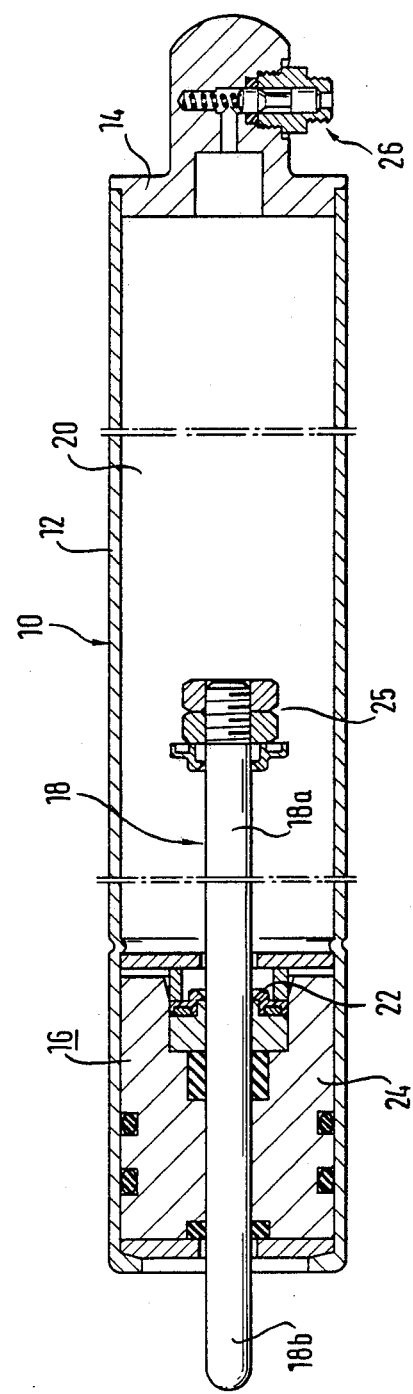
FIG. 1 is a longitudinal sectional view of a pneumatic spring including the novel valve structure of the present invention.

In the representative embodiment of the invention shown in FIG. 1, a pneumatic spring includes a cylinder 10 defined by a cylindrical side wall 12, an end member 14 that closes the inner end of the cylinder and a sealing and guiding unit 16 located at the outer end of the cylinder. A plunger-type piston rod 18 passes through the sealing and guiding unit 16 such that the inner portion 18a of the piston rod is within the fluid chamber 20 defined within the cylinder 10 and the outer portion 18b of the piston rod is outside the cylinder 10. The sealing and guiding unit 16 is generally conventional, and includes a lip-seal member 22 which is mounted in a guiding block 24 and which is in sealing engagement with the cylindrical outer face of the piston rod 18. An abutment member 25 carried by the inner end of the piston rod 18 limits the outward movement of the piston rod from the fluid chamber 20.

Although not shown in FIG. 1, it will be understood that the piston rod 18 may be provided at its inner end with a piston of the type which slides along the inner cylindrical face of the side wall 12. Where desired, such piston may be provided with one or more fluid passages interconnecting the two chambers defined within the fluid chamber 20 by the piston. These passages may be sized and arranged so as to throttle fluid flow across the piston, as in U.S. Pat. No. 4,030,716, for example, and may also be of such construction that the throttling effect is dependent on the direction of movement of the piston rod 18 with respect to the container 10, as in U.S. Pat. No. 3,207,498, for example. Alternatively or additionally, the piston and/or another component of the spring may include structure for releasably locking the piston relative to the cylinder, as in U.S. Pat. No. 3,447,645, for instance. The fluid chamber 20 contains a fluid under pressure, e.g. a gas under high pressure up to 100 bar, and may if desired be partially filled with oil.

Figure 2:
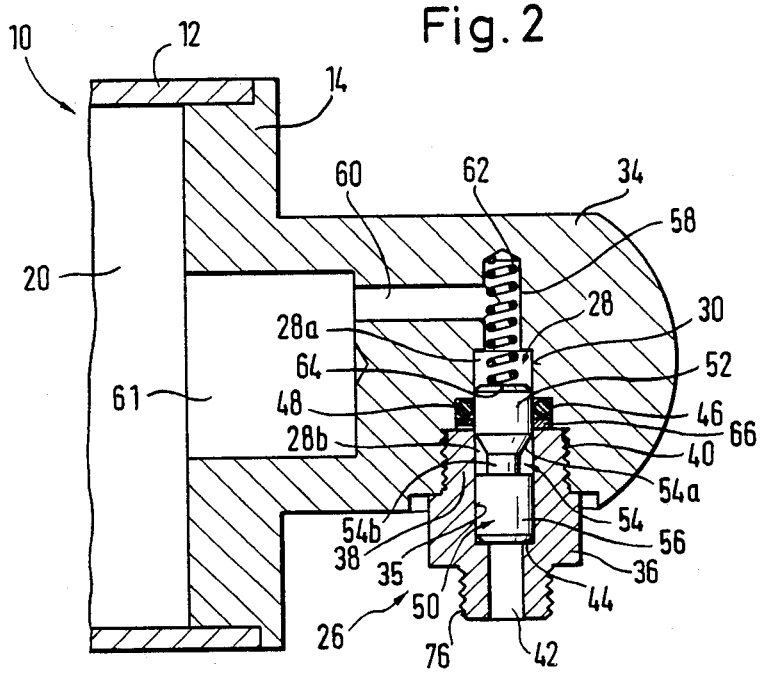
FIG. 2 is an enlarged sectional view of the valve structure of FIG. 1.
Figure 3:
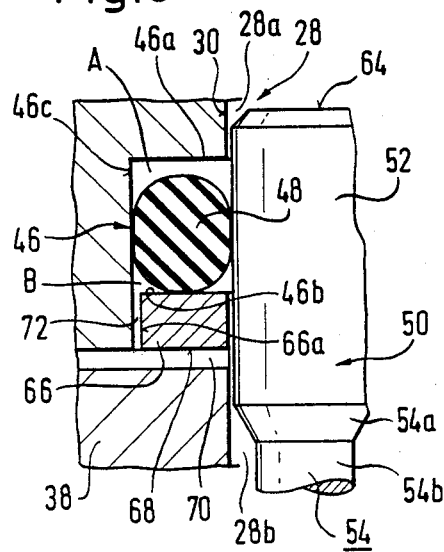
FIG. 3 is a further enlarged detail view of part of the valve structure.

As shown generally in FIG. 1 and in more detail in FIGS. 2 and 3, the inner end member 14 of the cylinder 10 is provided with a valve assembly 26. With particular reference now to FIG. 2, the valve assembly 26 includes a valve channel 28 that is defined in part by (1) a cylindrical bore 30 formed in a boss 34 integral with the end member 14 and (2) a cylindrical bore 35 formed in a cap member 36. The cap member 36 is provided with an externally threaded mounting portion 38 which mates with an internally threaded mounting bore 40 of the boss 34. The bore 35 of the cap member 36 has substantially the same diameter as, and is preferably coaxial with, the bore 30 in the boss 34. At the outer end of the cap member 36, the bore 35 has a section 42 of reduced diameter, an axially-facing shoulder 44 being defined by this reduction in cross section. An annular groove 46, described more fully hereinafter, is provided in the cylindrical wall of the bore 30 for receipt of an annular sealing member 48. The annular sealing member 48, formed of rubber or other suitable elastomeric material, separates the valve channel into a first part 28a and a second part 28b, the first part 28a of which is in fluid connection with the fluid chamber 20 via the ducts 58 and 60 in the boss 34 and the recess 61 in end member 14. Within the valve channel 28, there is housed a valve body 50, comprised of a first cylindrical portion 52, a second portion 54 of reduced diameter, and a third cylindrical portion 56. The second portion 54 preferably comprises a conical subportion 54a and a cylindrical subportion 54b. A compression helical spring 62 mounted within the bore 58 acts on the axially inner face 64 of the valve body 50 so as to bias valve body 50 into a first position at which the shoulder 44 on the cap member 36 and the axially-outer face of the third portion 56 of the valve body 50 are in engagement.

Turning now to FIG. 3, the annular groove 46 may be seen to be defined by a first radial face 46a, a second radial face 46b, and a cylindrical face or wall 46c. The second radial face 46b is preferably carried by a separate annular disc 66 located adjacent the axially directed face 68 of the mounting portion 38. The end face 68 is formed with a radial groove 70 for a purpose described hereinafter. The external diameter of the annular disc 66 is somewhat smaller than the internal diameter of the cylindrical wall 46c so that an annular gap 72 is defined between the cylindrical wall 46c and the outer peripheral face 66a of the annular disc 66.

In the position of the valve assembly shown in FIGS. 2 and 3, the first cylindrical portion 52 of the valve body 50 engages the annular sealing member 48, and the member 48 engages both the second radial face 46b and the cylindrical wall 46c of the annular groove 46. Thus both sections 28a and 28b of the valve channel 28 are separated from each other in a fluid tight manner. When the valve body 50 is moved axially inwardly away from the first position shown in FIGS. 2 and 3, the second portion 54 of the valve body comes into axial alignment with the annular sealing member 48. The cross section of the annular sealing member 48 will thereupon expand due to its inherent structural elasticity, but the sealing member 48 is preferably so sized and selected that the inner face thereof will not, under normal conditions, contact the outer face of the second body portion 54. Suitably, the outer diameter of the first portion 52 of the valve body 50 is somewhat smaller than the internal diameter of the bore 30. It will be seen, therefore, that the first part 28a of the valve channel 28 will be in fluid connection with the second part 28b of the valve channel when the valve body 50 is in the second, i.e. axially inward, position and the annular sealing member 48 is in axial alignment with the second portion 54 of the valve body 52. As noted, the structural inner elasticity of the annular sealing member 48 will, under normal conditions, keep the member from contacting the surface of the portion 54 of the valve body 50 when the member 48 and the body portion 54 are axially aligned, i.e., when the valve body 52 is in the second position.

Upon movement of the valve body 50 from the second, or inner, position to the first, or outer, position (shown in FIGS. 2 and 3), the conical subportion 54a of the second portion 54 slides over the annular sealing member 48 and carefully compresses the member 48 radially outward into the configuration shown in FIG. 3. Hence, no damage results to the annular sealing member 48 by the operational movements of the valve body 50 under normal conditions.

When the valve body 50 moves axially inward from the first position (FIGS. 2 and 3) to the second position, pressure acting in zone A of the annular groove 46 might on occasion have a tendency to press the annular sealing member 48 radially inwardly against the valve body 50, thereby tending to maintain the sealing member 48 in sealing contact with the valve body 50 even when the second portion 54 of the valve body 50 comes into axial alignment with the annular sealing member 48. As will be appreciated, this could have the undesired result that fluid connection between the inner and outer sections 28a and 28b, respectively, of the valve channel 28 could be blocked, in view of the possible contact of the sealing member 48 with both the valve body 50 and the radial face 46b, or alternatively, that fluid connection between sections 28a and 28b of the valve channel 28 would exist around the outer periphery of the annular sealing member 48. Either condition is undesirable. In accordance with the invention both conditions are avoided by the provision of the aforementioned annular gap 72 and radial groove 70, which together define a pressure-balancing path between zone B of the annular groove 46 and the axially-outer section 28b of the valve channel 28. Should a pressure region develop anywhere along the periphery of the annular sealing member 48 which tends to urge the member radially inward when the conical subportion 54a comes into axial alignment with the sealing member 48, a passage from zone A to zone B of the groove 46 would open at the radial outer periphery of the annular sealing member 48, which passage would automatically result in a reduction of the pressure acting on the radially outer face of the annular sealing member 48 by equalizing the pressure between zones A and B via the gap 72 and the groove 70. This pressure reduction on the outer periphery of the annular sealing member 48 has the consequence that the pressure acting on the radial inner periphery of the annular sealing member 48 tends to move the member radially outward away from the valve body, which movement may be assisted by the structural elasticity of the annular sealing member 48. To that purpose, the configuration of the annular sealing member 48 is preferably such that its inner surface is normally spaced from the surface of the body portion 54. A passage is therefore opened for fluid flow at the inner periphery of the annular sealing member 48. Once such passage has been opened, even if only over a restricted arc along the outer periphery of the sealing body 54, the passage will automatically enlarge so as to extend around the entire periphery of the valve body 50. This assures that following movement of the valve body 50 from the first position of FIGS. 2 and 3 to the second position in which the sealing member 48 is in axial alignment with the second valve body portion 54, fluid will pass from part 28a to part 28b of the valve channel through the annular gap existing between the sealing member 48 and the second portion 54 of the valve body 50. This is essential because only in such case can the valve body 52 return from the second, axially inner position to the first, axially outer position (FIGS. 2 and 3) without doing damage to the annular sealing member 48.

Figure 4:
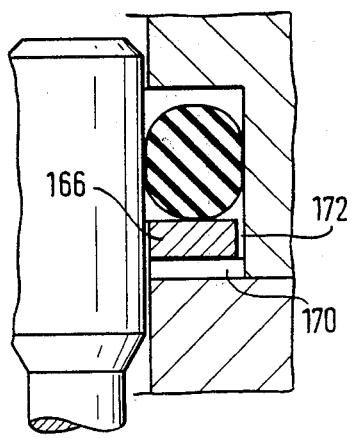
FIG. 4 is a detail view similar to FIG. 3 but showing an alternative construction in accordance with the invention.

The embodiment of FIG. 4 is essentially the same as the embodiment of FIG. 3, except that the radial groove 170 is provided in the axially-outer face of the annular disc 166 instead of in the inner face of the mounting portion 38. The annular gap 172 connects with the groove 170 in the same manner as in FIG. 2.

As will be understood by those skilled in the art, the pneumatic spring of the present invention is useful in many applications, e.g., as a weight-balancing device for use with automobile doors, hoods, or the like, as a height-adjustment device in chair columns, tables, etc., as a suspension device for light sources, and so forth. In many such applications it is distinctly advantageous to be able to adjust the fluid pressure within the pneumatic spring to suit the requirements of the specific end use of the spring. The improved valve structure of the invention permits such adjustment to be carried out expeditiously. Returning briefly to FIG. 2, it may be seen that the cap member 36 is formed with an external thread 76 on the axially outer end thereof to facilitate the connection thereto of any suitable pressure source (not shown). The pressure source may be connected to the cap 36 member by a fitting provided with a pin acting on valve body portion 56 so as to move the valve body 50 from the first position shown in FIG. 2 to the second position, at which position fluid connection between sections 28a and 28b of the valve channel 28 is established. If desired, a multiple-position valve may be provided in the line connecting cap member 36 to the pressure source to permit switching between the pressure source, for recharging of the cylinder 10 for example, and atmosphere, for pressure-relief for example. As will be appreciated, the third portion 56 of valve body 50 has a diameter somewhat smaller than the inner diameter of the bore 35 to provide clearance for fluid flow between the valve body and the surrounding bore 35.

Although the invention has been described with reference to specific embodiments thereof, many modifications and variations of such embodiments may be made by those skilled in the art without departing from the inventive concepts disclosed. Accordingly, all such modifications and variations are intended to be included within the spirit and scope of the appended claims.

I claim:

1. In a pneumatic spring including a cylinder having a closed end wall and an apertured end wall, a piston rod extending through said apertured end wall for reciprocation within said cylinder, seal means for establishing a fluid tight seal between said apertured end wall and said piston rod, and a valve in said cylinder for establishing fluid connection between the interior and exterior of the cylinder, the improvement in said valve comprising:

(a) means defining a generally cylindrical valve channel, a first part of which is in fluid connection with the interior of the cylinder and a second part of which is in fluid connection with the exterior of the cylinder;

(b) means defining an annular groove opening into said valve channel and extending radially outward from the longitudinal axis thereof;

(c) a valve body having a first, generally cylindrical portion and a second portion smaller in cross section than said first portion, said valve body being mounted within said valve channel for axial movement therein between a first position and a second position;

(d) an annular sealing member housed within said annular groove in surrounding relation to said valve body, said sealing member (1) engaging said first valve body portion and sealing said first valve channel part from said second valve channel part when said valve body is in said first position and (2) being in alignment with said second valve body portion and permitting fluid flow between said first and second valve channel parts when said valve body is in said second position;

(e) means for normally biasing said valve body towards said first position; and (f) means for enabling movement of said valve body to said second position against the force of said biasing means.

2. The pneumatic spring of claim 1, wherein said cylinder contains a fluid under superatmospheric pressure.

3. The pneumatic spring of claim 2, wherein at least a part of said fluid is a gas.

4. The pneumatic spring of claim 1, wherein said second valve body portion has a generally circular cross section.

5. The pneumatic spring of claim 4, wherein said second valve body portion comprises a first generally conical subportion adjacent said first valve body portion, the diameter of said first subportion decreasing in a direction away from said first valve body portion from a diameter corresponding to the diameter of said first valve body portion to a smaller diameter.

6. The pneumatic spring of claim 5, wherein said second valve body portion comprises a second subportion adjacent said first subportion, said second subportion having a diameter corresponding to said smaller diameter.

7. The pneumatic spring of claim 1, wherein said valve body comprises a third portion at the end of said second valve portion remote from said first valve body portion.

8. The pneumatic spring of claim 7, wherein said third valve body portion is generally cylindrical and has a diameter smaller than the diameter of said valve channel.

9. The pneumatic spring of claim 8, wherein said valve channel has a section of reduced diameter adjacent said second valve channel part, a shoulder being defined by said reduction in diameter, said shoulder and said third valve body portion being in axial engagement when said valve body is in said first position.

10. The pneumatic spring of claim 1, wherein said biasing means engage said first valve body portion at the end thereof remote from said second valve body portion.

11. The pneumatic spring of claim 1, wherein said biasing means comprises a helical compression spring.

12. The pneumatic spring of claim 1, wherein said annular groove defining means comprises a first substantially radial face adjacent said first valve channel part, a second substantially radial face adjacent said second valve channel part, and a generally cylindrical outer face extending in a substantially axial direction between said first and said second radial faces.

13. The pneumatic spring of claim 12, further comprising pressure-balancing means for connecting the zone of said annular groove which is adjacent said cylindrical outer face and adjacent said second radial face in fluid communication with said second valve channel part.

14. The pneumatic spring of claim 1, wherein said annular sealing member has a substantially circular cross section when out of contact with said valve body and when regarded in a plane containing the axis of said valve channel.

15. The pneumatic spring of claim 1, wherein the normal internal diameter of said annular sealing member is larger than the external dimension of said second valve body portion such that said sealing member is biased by its normal structural elasticity into a position away from said second valve body portion when said vave body is in said second position.

16. The pneumatic spring of claim 1, wherein a first axial section of said valve channel is defined by a bore in an integral part of said cylinder and a second axial section of said valve channel is defined by a bore in a cap member removably mounted to said integral part.

17. The pneumatic spring of claim 16, wherein said cap member includes a cylindrical mounting portion which is received in a mounting bore in said integral part, said annular groove being defined in part by an axially outwardly directed radial face and a generally cylindrical wall adjacent thereto formed on the inner wall of said mounting bore and in part by a radial end face of said mounting portion closing said annular groove in the axial direction.

18. The pneumatic spring of claim 17, wherein an annular disc is located in said annular groove, said annular disc being adjacent said end face, said annular sealing member being located axially between said annular disc and said axially outwardly directed radial face.

19. The pneumatic spring of claim 18, further comprising means defining at least one radially extending groove in said radial end face of said mounting portion, and means defining a gap between the radially outer peripheral face of said annular disc and said generally cylindrical wall of said annular groove, said radially extending groove and said gap establishing a fluid connection between said annular groove and said second valve channel part.

20. The pneumatic spring of claim 18, further comprising means defining at least one radially extending groove in the face of said annular disc which is adjacent said radial end face of said mounting portion, and means defining a gap between the radially outer peripheral face of said annular disc and said generally cylindrical wall of said annular groove, said radially extending groove and said gap establishing a fluid connection between said annular groove and said second valve channel part.

* * * * *